(12) United States Patent
Jeon

(10) Patent No.: US 6,579,470 B1
(45) Date of Patent: Jun. 17, 2003

(54) POLYMER ASSEMBLE LIQUID CRYSTAL USED IN LIQUID CRYSTAL DISPLAY

(75) Inventor: Young-Jae Jeon, Seoul (KR)

(73) Assignee: D.D. Tech, Inc., Seoul (KR)

( * ) Notice: Subject to any disclaimer, the term of this patent is extended or adjusted under 35 U.S.C. 154(b) by 334 days.

(21) Appl. No.: 09/605,046

(22) Filed: Jun. 27, 2000

(51) Int. Cl.⁷ .................. C09K 19/38; C09K 19/42; C09K 19/60
(52) U.S. Cl. ................. 252/299.01; 252/299.1
(58) Field of Search ................. 252/299.01, 299.1

(56) References Cited

U.S. PATENT DOCUMENTS

| | | | |
|---|---|---|---|
| 5,389,287 A | * 2/1995 | Nishiyama et al. | 252/299.01 |
| 5,466,496 A | * 11/1995 | Jin | 428/1.1 |
| 5,530,566 A | * 6/1996 | Kumar | 349/86 |
| 5,942,155 A | * 8/1999 | Coles et al. | 252/299.64 |

* cited by examiner

Primary Examiner—Shean C. Wu
(74) Attorney, Agent, or Firm—Perkins Coie LLP

(57) ABSTRACT

A polymer assemble liquid crystal includes equal to or less than 40 wt % of a liquid crystal mixture of ferroelectric and antiferroelectric liquid crystals and equal to or more than 60 wt % of a polymer. The polymer is obtained by polymerizing urethane acrylate oligomer and (meth)acrylate. A ratio of the ferroelectric liquid crystal to the antiferroelectric liquid crystal in the liquid crystal mixture is about 3:1.

5 Claims, No Drawings

POLYMER ASSEMBLE LIQUID CRYSTAL USED IN LIQUID CRYSTAL DISPLAY

BACKGROUND OF THE INVENTION

1. Field of the Invention

The present invention relates to a liquid crystal display and, more particularly, to a polymer assemble liquid crystal used in the liquid crystal display.

2. Descriptions of the Prior Art

A liquid crystal display is a display device which can show an image using an electro-optical characteristic of a liquid crystal which is injected into a space defined by two opposing substrates. The electro-optical characteristic of the liquid crystal appears when electric power is applied thereto.

Such a liquid crystal display (LCD) is classified into a variety of types including twisted nematic (TN), super twisted nematic (STN), electrically controllable birefringence (ECB), thin film transistor (TFT), and polymer dispersed (PD) LCDs.

Among the LCDs, both the TN and STN LCDs use two polarizing films, deterioration the brightness of the LCD due to a light loss. Furthermore, since liquid crystal molecules are oriented in a predetermined direction, the viewing angle is reduced.

The polymer dispersed LCD shows an image by scattering or absorbing light as fine liquid crystal drops formed in a matrix of polymer material reacts in response to outer voltage applied thereto. The polymer dispersed LCD does not use any polarizing film, improving the brightness. In addition, since a rubbing process for orienting liquid crystal molecules is not required, the manufacturing process is simple.

However, the contrast of the polymer dispersed LCD is low, making it difficult to realize letters on a screen. Furthermore, when the content of a liquid crystal is insufficient, liquid crystal properties deteriorate such that the polymer dispersed LCD cannot function as a display device. On the other hand, if the content of the liquid crystal is more than 50%, since the display may rapidly age by ultraviolet, it is only used as an interior optical shutter, while being limited in its uses.

In addition, a conventional polymer dispersed liquid crystal is designed such that nematic liquid crystal molecules are oriented according to a direction where voltage is applied thereto. However, since molecules of the nematic liquid crystal are not regularly oriented, light intercepting effects deteriorate.

SUMMARY OF THE INVENTION

Therefore, the present invention has been made in an effort to solve the above described problems.

It is an objective of the present invention to provide a polymer assemble liquid crystal that can improve a response time, a high contrast and an optical stability of a liquid crystal display, and which can be mixed with a polymer at a low mixing ratio.

To achieve the above objective, the present invention provides a polymer assemble liquid crystal comprising less than 40 wt % of a liquid crystal mixture of ferroelectric and antiferroelectric liquid crystals and more than 60 wt % of a polymer.

Preferably, the polymer is less than 80 wt %.

Further preferably, the ferroelectric liquid crystal in the liquid crystal mixture is in a range of 15–30 wt % by weight of the polymer assemble liquid crystal.

The polymer is obtained by polymerizing urethane acrylate oligomer and (meth)acrylate monomer.

The liquid crystal mixture may be further mixed with a dye, while maintaining 40 wt % by weight of the polymer assemble liquid crystal.

DETAILED DESCRIPTION OF PREFERRED EMBODIMENTS

A polymer assemble liquid crystal of the present invention comprises less than 40 wt % of a liquid crystal mixture of ferroelectric and antiferroelectric liquid crystals and more than 60 wt % of a polymer.

The ferroelectric liquid crystal is selected from the group consisting of

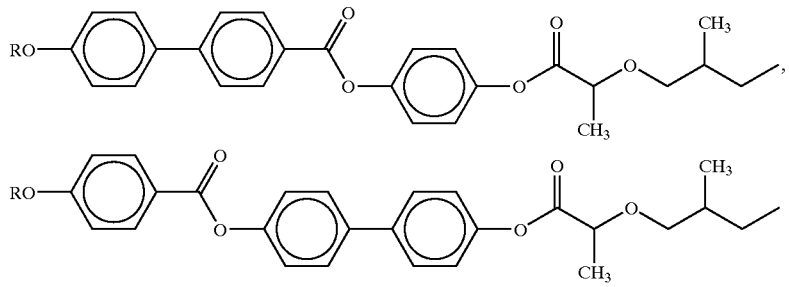

(where, R is alkyl group of $C_8$~$C_{12}$), and

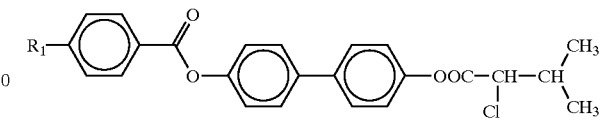

(where, $R_1$ is alkyl group of $C_7$~$C_{10}$).

The antiferroelectric liquid crystal is selected from the group consisting of

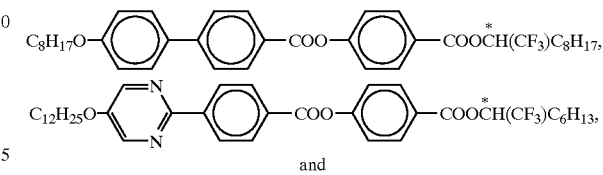

and

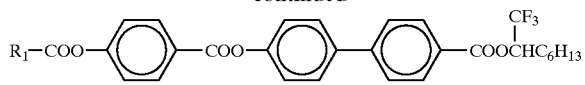

(where, $R_1$ is alkyl group of $C_7$-$C_{10}$).

The polymer is obtained by polymerizing urethane acrylate oligomer and (meth)acrylate monomer.

Examples of the urethane acrylate oligomer are commercially available, for instance, CN 972 (the trademark of Sartomer, Japan), EB 4827(the trademark of Radcure, Japan), or Aronix(the trademark of Dong-a synthetic chemical, Japan).

The (meth)acrylate monomer is an acrylate monomer or a methacrylate monomer such as ethylhexyl acrylate (EHA), hexanediol dimethacrylate(HDDMA), trimethylolpropane triacrylate(TMPTA), or dipentaerythritol pentaacrylate (DPETA).

In the present invention, a small amount of dye may be added to the liquid crystal mixture. At this point, the liquid crystal mixture including the dye is maintained at 40 wt %. The dye is commercially available, for instance, D5 and D35 (the trademarks of BDH Company, England), L-dye B (the trademark of Roche, Switzerland), or G209, G168, G165, G224, and G232(the trademarks of Japanese Photo-sensitive Pigment Lab., Japan).

Reference will now be made in detail to examples of the present invention.

EXAMPLE 1

30 wt % of

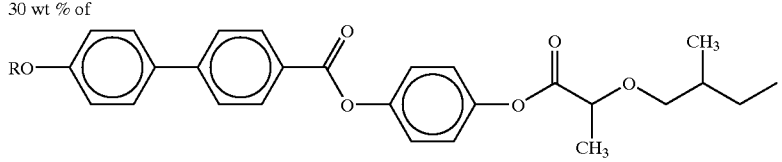

(where, R is alkyl group of $C_8$~$C_{12}$) and 10 wt % of

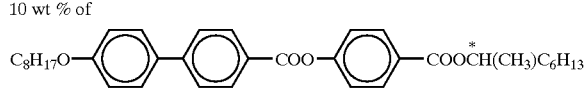

were first prepared as ferroelectric and antiferroelectric liquid crystals, respectively. Then, the ferroelectric and antiferroelectric liquid crystals were heated to an isotropic liquid crystal state, then mixed with each other, after which they were slowly cooled at a room temperature so that crystal is not trapped.

The mixed liquid crystal material was mixed with urethane acrylate and trimethylol propane triacrylate(TMPTA), thereby obtaining polymer assemble liquid crystal having 40 wt % of the mixed liquid crystal material and 60 wt % of a polymer polymerized with urethane acrylate and trimethylol triacrylate(TMPTA).

EXAMPLE 2

Polymer assemble liquid crystal was obtained using the same materials as those of Example 1 except that the content of the mixed liquid crystal material was reduced to 20 wt %. At this point, the ratio of ferroelectric liquid crystal to antiferroelectric liquid crystal is about 3:1. That is, polymer assemble liquid crystal having 20 wt % of ferroelectric and antiferroelectric liquid crystals and 80 wt % of a polymer polymerized with urethane acrylate and trimethylolpropane triacrylate(TMPTA) was obtained.

EXAMPLE 3

30 wt % of (image of structure)

(where, R is alkyl group of $C_8$~$C_2$) and 10 wt % of

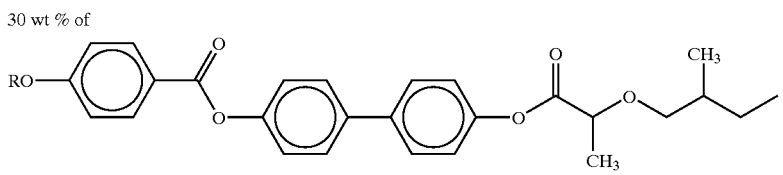

were prepared as ferroelectric and antiferroelectric liquid crystals, respectively. Then, the ferroelectric and antiferroelectric liquid crystals were heated to an isotropic liquid crystal state, then mixed with each other, after which they were slowly cooled at a room temperature so that crystal is not trapped.

The mixed liquid crystal material was mixed with urethane acrylate and ethylhexyl acrylate(EHA), thereby obtaining polymer assemble liquid crystal having 40 wt % of the mixed liquid crystal material and 60 wt % of a polymer polymerized with urethane acrylate and ethylhexyl acrylate (EHA).

EXAMPLE 4

Polymer assemble liquid crystal was obtained using the same materials as those of Example 3 except that the content of the mixed liquid crystal material was reduced to 20 wt %. At this point, the ratio of ferroelectric liquid crystal to antiferroelectric liquid crystal is about 3:1. That is, polymer assemble liquid crystal having 20 wt % of ferroelectric and antiferroelectric liquid crystals and 80 wt % of a polymer polymerized with urethane acrylate and ethylhexyl acrylate (EHA) was obtained.

EXAMPLE 5

30 wt % of

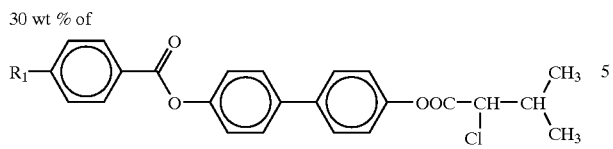

(where, $R_1$ is alkyl group of $C_7$~$C_{10}$) and 10 wt % of

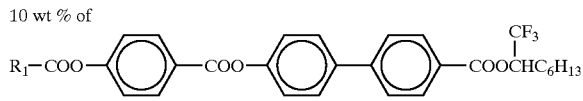

(where, $R_1$ is alkyl group of $C_7$~$C_{10}$) were prepared as ferroelectric and antiferroelectric liquid crystals, respectively. Then, the ferroelectric and antiferroelectric liquid crystals were heated to an isotropic liquid crystal state, then mixed with each other, after which they are slowly cooled at a room temperature so that crystal is not trapped.

The mixed liquid crystal material was mixed with urethane acrylate and hexanediol dimethacrylate(HDDMA), thereby obtaining polymer assemble liquid crystal having 40 wt % of the mixed liquid crystal material and 60 wt % of a polymer polymerized with urethane acrylate and hexanediol dimethacrylate(HDDMA).

EXAMPLE 6

Polymer assemble liquid crystal was obtained using the same materials as those of Example 5 except that the content of the mixed liquid crystal material was reduced to 20 wt %. At this point, the ratio of ferroelectric liquid crystal to antiferroelectric liquid crystal is about 3:1. That is, polymer assemble liquid crystal having 20 wt % of ferroelectric and antiferroelectric liquid crystals and 80 wt % of a polymer polymerized with urethane acrylate and hexanediol dimethacrylate(HDDMA) was obtained.

EXAMPLE 7

A mixed liquid crystal material was obtained as in the Example 1, then D5 dye (the trademark of BDH company, England) was mixed to the mixed liquid crystal material to be resolved therein, thereby obtaining a dye-mixed liquid crystal material.

The dye-mixed liquid crystal material was mixed with urethane acrylate and trimethylolpropane triacrylate (TMPTA), thereby obtaining polymer assemble liquid crystal having 40 wt % of the dye-mixed liquid crystal material and 60 wt % of a polymer polymerized with urethane acrylate and trimethylolpropane triacrylate(TMPTA).

The dye mixed in the mixed liquid crystal material shows colors by a Guest-Host effect where the dye is oriented in a direction the liquid crystal molecules are oriented when voltage is applied to the liquid crystal.

EXAMPLE 8

A mixed liquid crystal material was obtained as in the Example 3, then L-dye B (the trademark of Roche, Switzerland) was mixed to the mixed liquid crystal material to be resolved therein, thereby obtaining a dye-mixed liquid crystal material.

The dye-mixed liquid crystal material was mixed with urethane acrylate and ethylhexyl acrylate(EHA), thereby obtaining polymer assemble liquid crystal having 40 wt % of the dye-mixed liquid crystal material and 60 wt % of a polymer polymerized with urethane acrylate and ethylhexyl acrylate (EHA).

EXAMPLE 9

A mixed liquid crystal material was obtained as in the Example 5, then G209 dye (the trademark of Japanese Photo-sensitive Pigment Lab., Japan) was mixed to the mixed liquid crystal material to be resolved therein, thereby obtaining a dye-mixed liquid crystal material.

The dye-mixed liquid crystal material was mixed with urethane acrylate and hexanediol dimethacrylate(HDDMA), thereby obtaining polymer assemble liquid crystal having 40 wt % of the dye-mixed liquid crystal material and 60 wt % of a polymer polymerized with urethane acrylate and hexanediol dimethacrylate(HDDMA).

COMPARATIVE EXAMPLE (PRIOR ART)

To compare prior art with the present invention, a conventional polymer dispersed liquid crystal was made by mixing 40 wt % of commercially available polymer with 60 wt % of nematic liquid crystal, then exposed to ultraviolet, thereby obtaining polymer dispersed liquid crystal.

EXAMPLE 10

LCD cells were manufactured using polymer assemble liquid crystals manufactured according to the above examples and the comparative example. Next, a series of tests were conducted under following conditions:

Location of light source: 20~30 cm away from the LCD cells,

Drive voltage: 20 V.

The test results regarding light transmission, response speed, contrast, and viewing angle are shown in the following table 1.

TABLE 1

| Item | | Unit | Example 1 | Example 2 | Example 3 | Example 4 | Example 5 |
|---|---|---|---|---|---|---|---|
| Response | Ton | msec | 39.8 | 68.3 | 40.8 | 62.4 | 39.0 |
| Time | Toff | | 26.0 | 22.3 | 26.0 | 23.2 | 25.8 |
| Contrast Ratio | | | 100:1 | 90:1 | 100:1 | 95:1 | 100:1 |
| Transmission | | % | 89.00 | 88.27 | 88.82 | 86.24 | 89.00 |
| Maximum Viewing angle | | degree | ±50 | ±45 | ±50 | ±45 | ±50 |

| Item | | Unit | Example 6 | Example 7 | Example 8 | Example 9 | Comparative Example |
|---|---|---|---|---|---|---|---|
| Response | Ton | msec | 39.4 | 44.2 | 52.4 | 50.2 | 139.8 |
| Time | Toff | | 26.0 | 23.4 | 24.7 | 25.8 | 125.9 |

TABLE 1-continued

| Contrast Ratio | | 90:1 | 100:1 | 100:1 | 95:1 | 10:1 |
|---|---|---|---|---|---|---|
| Transmission | % | 86.18 | 89.00 | 88.36 | 87.47 | 70.0 |
| Maximum Viewing angle | degree | ±50 | ±50 | ±50 | ±45 | ±40 |

As shown in table 1, the polymer assemble liquid crystals according to the examples of the present invention have a light transmission of about 86–89%, a response time less than 100 msec, a contrast ratio of 100:1, and a viewing angle of about ±50, all of which are improved when compared with the comparative example.

As described above, the polymer assemble liquid crystal of the present invention solves the problems of prior art. That is, by using a mixture of ferroelectric and antiferroelectric liquid crystals having a spontaneous polarization, overall optical effects such as light transmission, contrast ratio, response time, and viewing angle are improved.

In addition, as the optical effects are improved, an advancing direction of light can be easily adjusted with a small amount of liquid crystal of the present invention. Therefore, even by reducing the mixture ratio of the liquid crystal, the device functions as a display, reducing the manufacturing costs.

Accordingly, the LCD device employing the polymer assemble liquid crystal of the present invention can be used as an optical shutter as well as a device for displaying letters.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A polymer assemble liquid crystal comprising equal to or less than 40% wt of a liquid crystal mixture of ferroelectric and antiferroelectric liquid crystals and equal to or more than 60 wt % of a polymer.

2. A polymer assemble liquid crystal of claim 1 wherein the amount of the polymer is less than 80 wt %.

3. A polymer assemble liquid crystal of claim 1 wherein the amount of the ferroelectric liquid crystal in the liquid crystal mixture is in a range of 15–30 wt % by the weight of the polymer assemble liquid crystal.

4. A polymer assemble liquid crystal of claim 1 wherein the polymer is obtained by polymerizing urethane acrylate oligomer and (meth)acrylate monomer.

5. A polymer assemble liquid crystal of claim 1 wherein the liquid crystal mixture is further mixed with dye, while maintaining 40 wt %.

* * * * *